(12) United States Patent
Cody et al.

(10) Patent No.: US 7,941,021 B2
(45) Date of Patent: May 10, 2011

(54) DISTRIBUTION CABLE ASSEMBLY HAVING MID-SPAN ACCESS LOCATION

(75) Inventors: Joseph Todd Cody, Hickory, NC (US); Julian Latelle Greenwood, III, Hickory, NC (US); Kenneth Darrell Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 308 days.

(21) Appl. No.: 12/341,311

(22) Filed: Dec. 22, 2008

(65) Prior Publication Data

US 2010/0158453 A1     Jun. 24, 2010

(51) Int. Cl.
*G02B 6/44* (2006.01)

(52) U.S. Cl. .................................... 385/100; 385/114

(58) Field of Classification Search .................. 385/100, 385/114
See application file for complete search history.

(56) References Cited

U.S. PATENT DOCUMENTS

| | | | |
|---|---|---|---|
| 6,493,500 B1 * | 12/2002 | Oh et al. ...................... | 385/135 |
| 6,856,748 B1 | 2/2005 | Elkins, II et al. ............. | 385/135 |
| 7,088,893 B2 | 8/2006 | Cooke et al. .................. | 385/100 |
| 7,127,143 B2 | 10/2006 | Elkins, II et al. ............. | 385/100 |
| 7,136,555 B2 | 11/2006 | Theuerkorn et al. .......... | 385/100 |
| 7,137,742 B2 | 11/2006 | Theuerkorn et al. .......... | 385/53 |
| 7,155,093 B2 | 12/2006 | Elkins, II et al. ............. | 385/100 |
| 7,190,866 B2 | 3/2007 | Greenwood et al. ......... | 385/103 |
| 7,197,214 B2 | 3/2007 | Elkins, II et al. ............. | 385/100 |
| 7,203,404 B2 | 4/2007 | Greenwood et al. ......... | 385/112 |
| 7,228,036 B2 | 6/2007 | Elkins, II et al. ............. | 385/100 |
| 7,242,841 B2 | 7/2007 | Greenwood et al. ......... | 385/137 |
| 7,244,066 B2 | 7/2007 | Theuerkorn .................. | 385/53 |
| 7,264,402 B2 | 9/2007 | Theuerkorn et al. .......... | 385/59 |
| 7,266,274 B2 | 9/2007 | Elkins, II et al. ............. | 385/100 |
| 7,272,282 B1 | 9/2007 | Seddon et al. ................ | 385/106 |
| 7,277,614 B2 | 10/2007 | Cody et al. ................... | 385/100 |
| 7,289,714 B1 | 10/2007 | Wells ............................ | 385/135 |
| 7,292,763 B2 | 11/2007 | Smith et al. .................. | 385/135 |
| 7,330,621 B2 | 2/2008 | Elkins, II et al. ............. | 385/100 |
| 7,346,243 B2 * | 3/2008 | Cody et al. ................... | 385/100 |
| 7,391,950 B2 | 6/2008 | Lewallen et al. ............. | 385/134 |
| 7,397,997 B2 | 7/2008 | Ferris et al. .................. | 385/135 |

(Continued)

OTHER PUBLICATIONS

Australian Government, IP Australia, First Office Action for corresponding AU Patent Application No. 2009251059, Nov. 1, 2010, 3 pages.

*Primary Examiner* — Uyen-Chau N Le
*Assistant Examiner* — John M Bedtelyon
(74) *Attorney, Agent, or Firm* — C. Keith Montogomery (57) ABSTRACT

The present disclosure is generally directed to a fiber optic distribution cable assembly having an interior portion and an exterior portion. A distribution cable includes a plurality of optical fibers disposed within the interior portion and at least one predetermined mid-span access location positioned along a length of the distribution cable to provide access from the exterior portion to the interior portion. At least one optical fiber of the distribution cable is accessed and terminated from the distribution cable within the interior portion of the distribution cable. A tether having a first end is attached to the distribution cable through the mid-span access location. The tether has at least one optical fiber optically connected to the at least one terminated optical fiber of the distribution cable at a location within the interior portion of the distribution cable.

5 Claims, 5 Drawing Sheets

U.S. PATENT DOCUMENTS

| | | |
|---|---|---|
| 7,400,815 B2 | 7/2008 | Mertesdorf et al. .......... 385/135 |
| 7,418,180 B2 | 8/2008 | Conrad et al. ................ 385/134 |
| 7,454,106 B2 * | 11/2008 | Cobb et al. ................... 385/100 |
| 7,471,862 B2 | 12/2008 | Bringuier et al. ............. 385/113 |
| 7,480,436 B2 | 1/2009 | Wells et al. .................. 385/134 |
| 7,489,843 B2 | 2/2009 | Carlson et al. ............... 385/100 |
| 7,609,925 B2 * | 10/2009 | Gronvall et al. ............. 385/100 |
| 2007/0025668 A1 * | 2/2007 | Greenwood et al. .......... 385/103 |
| 2008/0080818 A1 | 4/2008 | Cobb, III et al. ............... 385/86 |
| 2008/0131068 A1 | 6/2008 | Mertesdorf et al. .......... 385/135 |
| 2008/0187276 A1 | 8/2008 | Roberts et al. ................ 385/114 |
| 2008/0226252 A1 | 9/2008 | Mertesdorf et al. .......... 385/135 |
| 2008/0247719 A1 | 10/2008 | Cody et al. ................... 385/114 |
| 2008/0260344 A1 | 10/2008 | Smith et al. .................. 385/135 |
| 2009/0022460 A1 | 1/2009 | Lu et al. ....................... 385/114 |
| 2009/0034918 A1 | 2/2009 | Caldwell et al. .............. 385/107 |
| 2009/0034919 A1 | 2/2009 | Caldwell et al. .............. 385/107 |

* cited by examiner

DISTRIBUTION CABLE ASSEMBLY HAVING MID-SPAN ACCESS LOCATION

TECHNICAL FIELD

The present invention relates generally to a distribution cable deployed in a fiber optic communications network, and more specifically, to a fiber optic distribution cable having a mid-span access location and a tether for providing access to at least one preterminated optical fiber of the cable.

BACKGROUND

Optical fiber is increasingly being used for a variety of broadband applications including voice, video and data transmissions. As a result, there is a need for connecting remote locations to a fiber optic distribution cable in order to provide broadband services to an end user, commonly referred to as a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx." networks. To provide these services to the subscriber, FTTx networks include a large number of interconnection points, referred to herein as "tap points," at which one or more optical fibers of a distribution cable are interconnected or mated to optical fibers of one or more cables leading to a subscriber location. In addition, in order to reduce installation labor costs in FTTx networks, communications service providers are increasingly demanding factory-prepared interconnection solutions, commonly referred to as "plug-and-play" systems.

To supply the large number of tap points needed and to satisfy the demand for plug-and-play systems, it is apparent that more efficient methods of providing mid-span access locations along the length of a distribution cable are needed. Typically, to perform a mid-span access of a distribution cable, a field technician first removes a section of the cable sheath at a convenient location along an installed distribution cable. Once the sheath is removed, the technician gains access to one or more optical fibers through the cable sheath, severs the accessed optical fibers and withdraws a length of the severed (or "terminated") optical fibers from the distribution cable. The length of the terminated optical fibers provides the field technician with the ability to splice one or more optical fibers of a cable comprising a lesser amount of optical fibers than the distribution cable (typically referred to as a "tether") to the terminated optical fibers of the distribution cable. Often an excess fiber length (EFL) or excess ribbon length (ERL) of the distribution optical fibers must be loaded into the tether or some other type of accumulation section. After splicing is completed, the mid-span access location is typically covered using an enclosure designed to protect the splices (which are external to the jacket of the distribution cable) and the exposed section of the distribution cable. This time-consuming process is typically accomplished by a highly skilled field technician at a significant cost and under less than ideal working conditions.

Several approaches have been developed to overcome the disadvantages of accessing, terminating and splicing optical fibers in the field. In one approach, the splicing of a tether to the distribution cable is performed at a factory during the manufacturing of the cable. The preterminated distribution cable, including the main cable, tether and associated splice closures, are assembled and wound onto a cable reel to be delivered to an installation site. Accordingly, favorable conditions in the factory for making high quality splices may be utilized, thereby increasing splice quality and also reducing the expense, difficulty and unfavorable conditions associated with splicing in the field. One disadvantage of this approach is that the tethers and splice closures are relatively bulky. For example, large enclosures are typically used to protect the splices and the section of the distribution cable that must be exposed to access the appropriate optical fibers to create the splices. In addition, the ERL/EFL of the distribution optical fiber can also lead to increased size of the tethers and/or splice closures. Accordingly, installation through small diameter conduits and over sheave wheels and pulleys is substantially more difficult, and sometimes impossible.

Therefore, it would be desirable to provide a factory-assembled fiber optic distribution cable having one or more predetermined mid-span access locations along the length of the distribution cable wherein each such mid-span access location has a tether connected directly thereto that does not have the bulk of traditional tethers and/or splice closures. It would also be desirable to provide a distribution cable in which the splices are in the interior of the distribution cable.

SUMMARY

The present disclosure is generally directed to a fiber optic distribution cable assembly having an interior portion and an exterior portion. A distribution cable includes a plurality of optical fibers disposed within the interior portion and at least one predetermined mid-span access location positioned along a length of the distribution cable to provide access from the exterior portion to the interior portion. At least one optical fiber of the distribution cable is accessed and terminated from the distribution cable within the interior portion of the distribution cable. A tether having a first end is attached to the distribution cable through the mid-span access location. The tether has at least one optical fiber optically connected to the at least one terminated optical fiber of the distribution cable at a location within the interior portion of the distribution cable.

In another embodiment, a fiber optic distribution cable assembly has an interior portion and an exterior portion. The exterior portion includes a first generally flat surface and a second generally flat surface, the first surface being generally parallel to the second surface. A distribution cable includes a plurality of optical fibers disposed within the interior portion and at least one predetermined mid-span access location positioned along a length of the distribution cable to provide access from the exterior portion to the interior portion. At least one optical fiber of the distribution cable is accessed and terminated from the distribution cable within the interior portion of the distribution cable. A tether having a first end is attached to the distribution cable through the mid-span access location. The tether has at least one optical fiber optically connected to the at least one terminated optical fiber of the distribution cable at a location within the interior portion of the distribution cable.

In yet another embodiment, a method for manufacturing a fiber optic distribution cable assembly includes accessing at least one of a plurality of optical fibers of a distribution cable by creating first and second access locations in the distribution cable, the second access location being spaced apart from the first access location along the distribution cable, terminating the at least one optical fiber of the distribution cable through the second access location, removing at least a portion of the at least one terminated optical fiber of the distribution cable through the first access location, inserting a first end of a tether through the second access location and removing the first end of the tether through the first access location so as to leave a portion of the tether remaining through the second access location, the tether including an optical fiber, optically connecting the at least one terminated optical fiber of the distribution cable to the optical fiber of the tether, and re-inserting the optically connected optical fiber of the distribution cable and tether through the first access location.

DETAILED DESCRIPTION

Reference will now be made in detail to the present preferred embodiments of the invention, and examples of which are illustrated in the accompanying drawings. Whenever possible, the same reference numerals will be used throughout the drawings to refer to the same or like parts.

Throughout the figures and various embodiments, the present invention provides a fiber optic distribution cable assembly having optical components therein. The distribution cable includes a tether that is spliced to at least one terminated optical fiber of the distribution cable at a location within the interior portion of the distribution cable. The fiber optic cable assemblies of the present invention do not require the bulky closures found in conventional cable assemblies but instead allow the tether to be connected directly to the distribution cable while maintaining structural integrity, sealing, and optical and mechanical performance. In certain embodiments, the tethers are installed in a factory during the production of the fiber optic distribution cable in order to produce factory-built, pre-engineered cable assemblies. Factory prepared assemblies can eliminate or reduce the need for first deploying a fiber optic distribution cable and then performing a mid-span access in the field. In alternative embodiments, the tethers can be applied to cables and other optical network components in accordance with the present invention after cable and component installation in order to provide more low profile mid-span access locations.

In the embodiments illustrated herein, terminated optical fibers accessed from the distribution cable are spliced to optical fibers of a tether having a predetermined length preferably not exceeding about 100 feet, more preferably not exceeding about 25 feet, and most preferably about 15 feet or less, or even about 3 feet or less. The remaining optical fibers of the distribution cable are managed and routed separately from the terminated optical fibers such that they extend uninterrupted through the distribution cable and are available for terminating at other downstream mid-span access locations. The tether presents the preterminated optical fibers of the distribution cable for interconnection with optical fibers of a fiber optic branch or fiber optic drop cable in an optical communications network in various configurations, including but not limited to, splice-ready optical fibers, pre-connectorized optical fibers and pre-connectorized optical fibers positioned within connector sleeve adapters of optical connection nodes or connector ports. One or more fiber optic branch cables (i.e., extended or secondary distribution cables) or fiber optic drop cables may be routed to the splice-ready optical fibers or connectorized optical fibers of the distribution cable presented on the tether at any time subsequent to the initial deployment of the distribution cable assembly. In all embodiments, the optical interconnection tether may be configured with a variety of connector types, such as but not limited to SC, LC, DC, FC, ST, SC/DC, MT-RJ, MTP, MPO and other like single or multi-fiber ferrules now known or hereafter developed.

Figure 7:
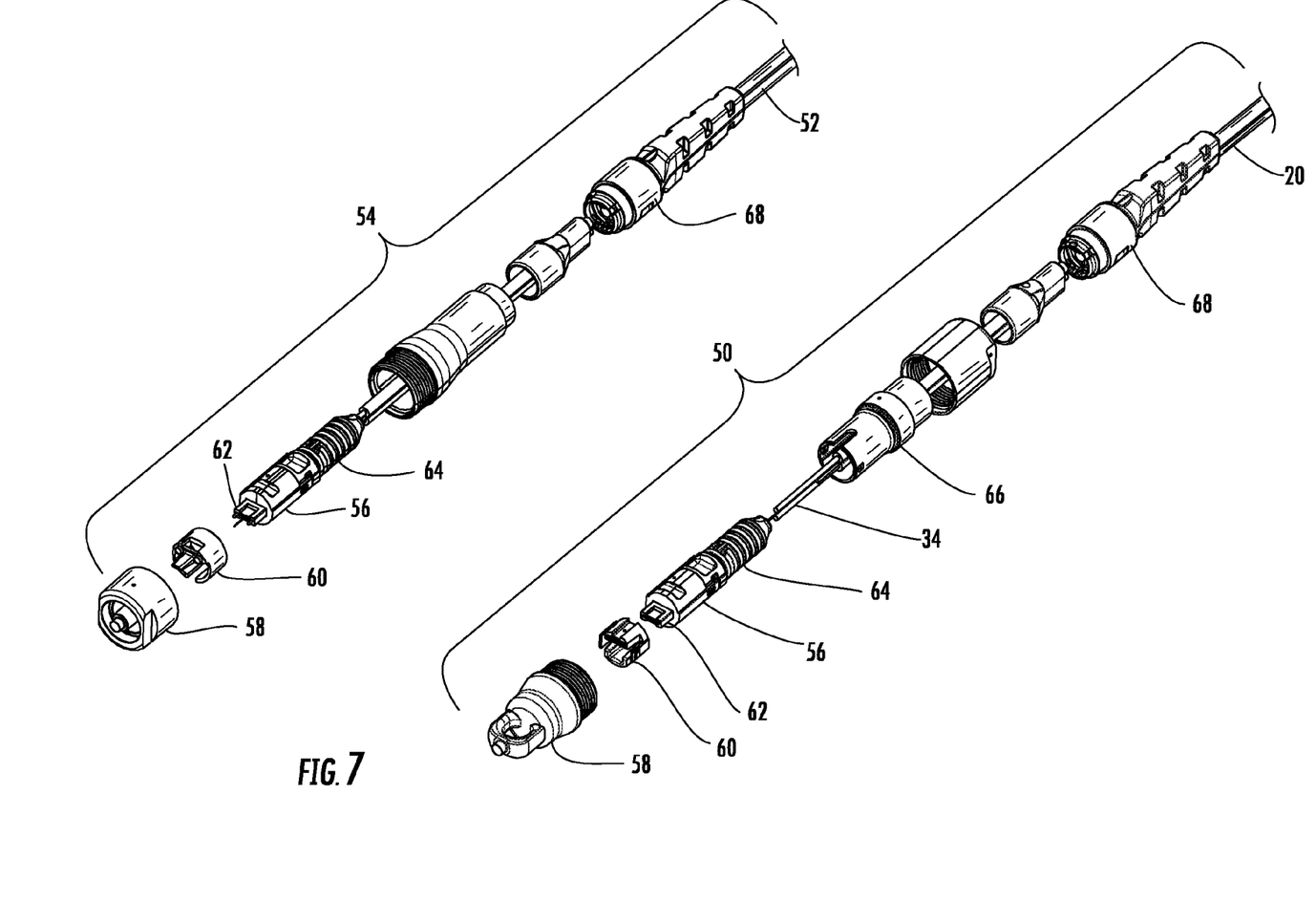
FIG. 7 is a perspective view of preconnectorized fiber optic cable using hardened connectors.

In certain embodiments, hardened connectors can be used with the fiber optic cables of the present invention. For instance, FIG. 7 depicts a partially exploded view of preconnectorized fiber optic tether 20 using a hardened connector 50 along with a partially exploded view of its complementary preconnectorized fiber optic cable 52 having hardened connector 54. Certain components illustrated of hardened connector 50, 54 include cap 58, adapter 60, ferrule 62, inner housing 56, spring (not visible), retention body 64, outer housing 66, and boot 68. However, other variations of hardened connectors according to the invention are possible and would be well known to one of ordinary skill in the art.

In all embodiments shown and described herein, various types of distribution cables may be accommodated, such as tubeless, monotube, loose tube, central tube, ribbon and the like. Regardless, the distribution cable is designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose optical fibers, tight-buffered optical fibers, ribbonized optical fibers, bundled optical fibers, micromodules, or any other expedient for transmitting light signals now known or hereafter developed. In certain embodiments, the distribution cable is somewhat flexible, easy to route and has no preferential bend. In all embodiments shown and described herein, various types of tethers may also be accommodated, such as tubeless, monotube, loose tube, central tube, ribbon, and the like.

Distribution cables and tethers can have any suitable shape(s) as would be known in the art. For instance, cross-sectional shapes can include round, rectangular, semi-rectangular, dog-bone or the like. Of course, other cross-sectional shapes are possible with the concepts of the present invention.

Figure 1:
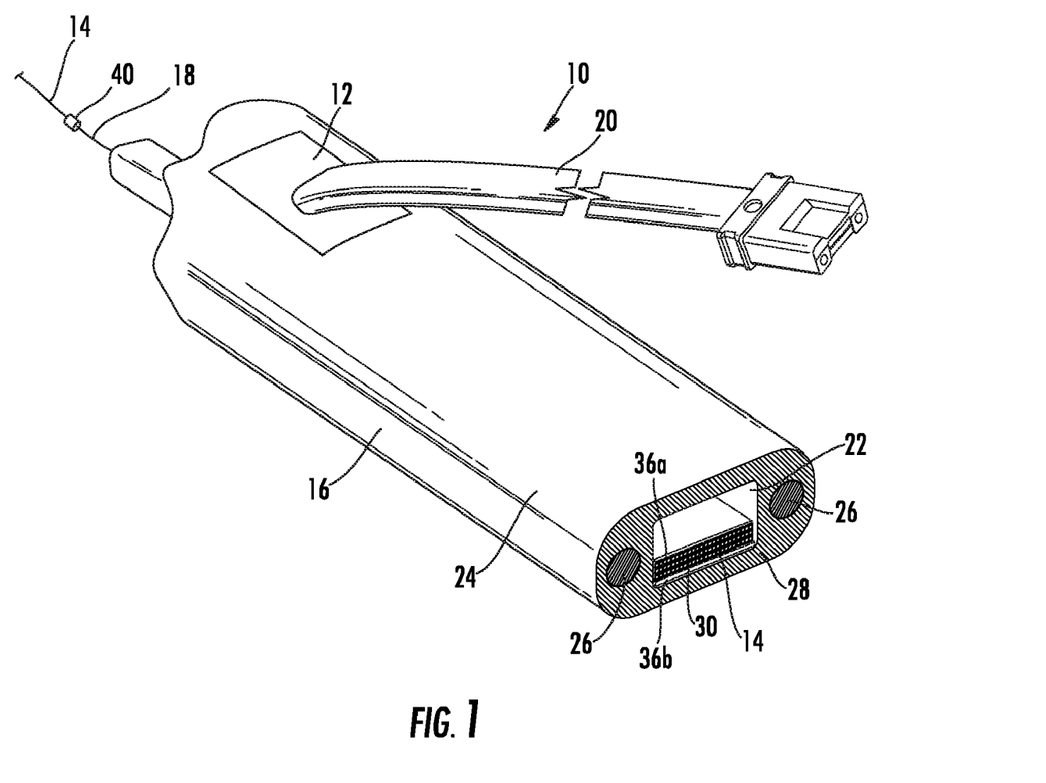
FIG. 1 is a perspective view of a distribution cable assembly according to an embodiment of the present invention.

Referring now to FIG. 1, a distribution cable assembly 10 having a mid-span access location 12 constructed in accordance with an embodiment of the present invention is illustrated. As shown, fiber optic distribution cable 16 can be a tubeless cable having a generally flat shape and a semi-rectangular cross-section. Fiber optic distribution cable 16 includes interior portion 22 and exterior portion 24. One or more optical fibers 14 of fiber optic distribution cable 16 are disposed in a cavity 30 of interior portion 22 between at least two strength members 26. Preferably, strength members 26 are single, unitary rod-like members formed of a dielectric material, such as glass reinforced plastic or the like. Strength members 26 are preferably surrounded by a cable jacket 28. Jacket 28 is preferably made of an impact and UV-resistant material designed to provide security for the optical fibers 14 and to protect the optical fibers 14 in an aerial or buried environment from environmental degradation. If the cable is intended for indoor applications or both indoor/outdoor applications, jacket 28 can preferably be constructed from a flame-retardant material. Suitable flame-retardant materials include polyvinyl chloride (PVC), polyvinylidene fluoride (PVDF), flame-retardant polyethylene (FRPE), although other suitable flame-retardant materials can be used. One or more dry inserts are also present in cavity 30. For instance, an upper dry insert 36a and lower dry insert 36b can be present. Dry inserts 36a, 36b perform functions such as cushioning, coupling, inhibiting the migration of water, accommodation of bending, and the like, and can be formed from foam tape or any other suitable material as would be known in the art.

Mid-span access location 12 provides access from an exterior portion 24 of fiber optic distribution cable 16 through cable jacket 28 to an interior portion 22, preferably cavity 30, and allows for optical connection of one or more optical fibers 18 of a tether 20 to one or more optical fibers 14 of fiber optic distribution cable 16.

As used herein, the term "tether" is intended to include fiber optic cable or a tubular body having one or more optical fibers disposed within the tubular body. As is well known and understood in the art, the optical fibers 18 of the tether 20 and the optical fibers 14 of the distribution cable 16 can be spliced together in any conventional manner, such as by fusion or mechanical splicing, either individually or en masse, to form splice 40 that is located within an interior portion 22 of distribution cable 16. A portion of tether 20 can also be located within an interior portion 22 of distribution cable 16.

Figure 2:
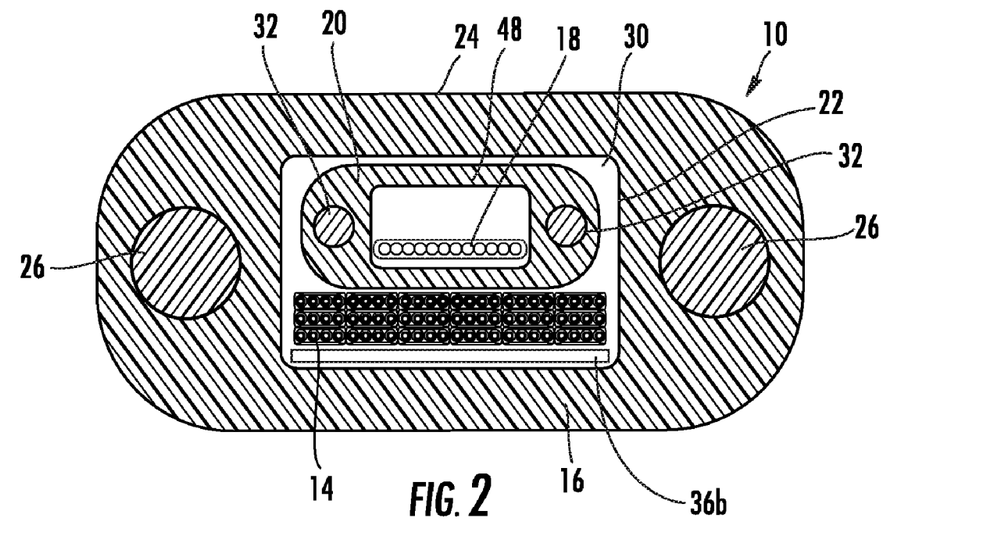
FIG. 2 is a cross-sectional view of the distribution cable assembly of FIG. 5.
Figure 5:
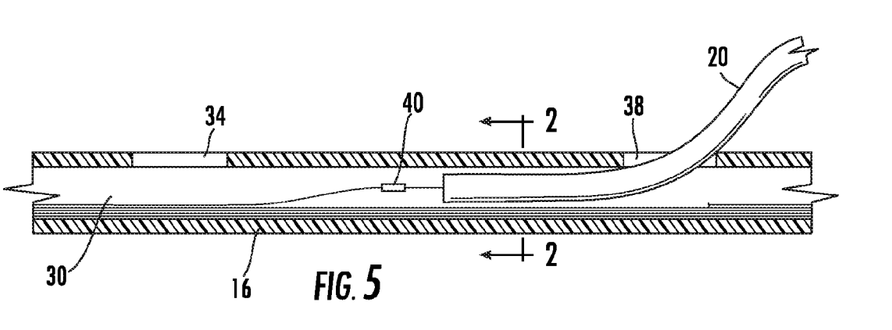
FIG. 5 is a side view of a distribution cable assembly according to certain aspects of the present invention.

FIG. 2 is a cross-sectional view of the distribution cable assembly 10 in which a portion of the tether 20 is located in the interior portion 22, taken on line 2-2 in FIG. 5. As shown in FIG. 2, cavity 30 can be sized to accommodate tether 20. Tether 20 can be a tubeless tether having a generally flat shape, with generally flat upper and lower surfaces. The tether 20 generally corresponds in shape to the interior space of the cavity 30, with a slightly smaller cross-sectional volume than the space between the cavity interior and the fibers 14. In FIG. 2, the upper dry insert 36a has been removed from a portion of the length of the cable 16 to accommodate the tether 20. As shown, tether 20 includes two strength members 32. Preferably, tether strength members 32 are single, unitary rod-like members formed of a dielectric material, such as glass reinforced plastic or the like. Tether 20 can have a jacket 48 made of an impact and UV-resistant material designed to provide security for the optical fibers 18 of the tether and to protect the optical fibers 18 in an aerial or buried environment from environmental degradation. In certain embodiments, tether jacket 48 can be modified to accommodate tether 20 within distribution cable cavity 30. For instance, a portion of jacket 48 can be removed to decrease the size of tether 20. If the tether 20 is intended for indoor applications or both indoor/outdoor applications, jacket 48 can be constructed from a flame-retardant material as described above.

The tether 20 can ultimately be interconnected with a fiber optic branch cable or a fiber optic drop cable containing one or more optical fibers connected to an outside plant optical connection terminal, such as a network interface device (NID) at a subscriber premises. Thus, the distribution cable assembly 20 provides a tethered distribution point or termination point in a fiber optic network for interconnecting optical fibers of a distribution cable with optical fibers of a branch cable or drop cable.

Figure 3:
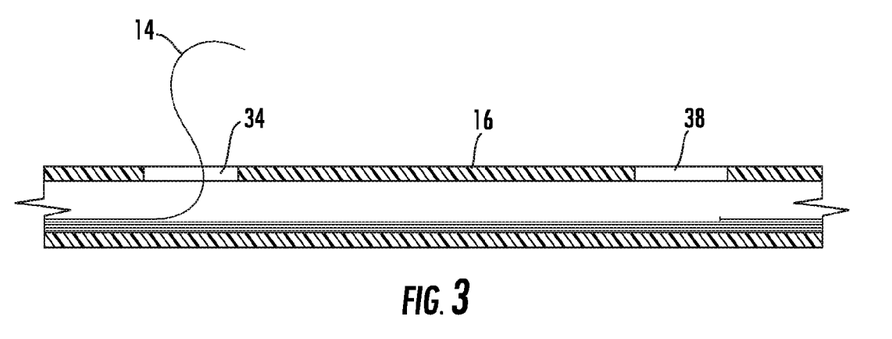
FIG. 3 is a side view of a distribution cable assembly according to certain aspects of the present invention.

Referring to FIGS. 3-6, a method of forming a distribution cable assembly in accordance with certain embodiments of the present disclosure will be described in more detail. As shown in FIG. 3, a first mid-span access location 34 and a second mid-span access location 38 are located in distribution cable 16. To create first mid-span access location 34 and second mid-span access location 38 in the factory, two separate sections of the jacket of the distribution cable 16 are removed. The length of access locations 34, 38 in the cable jacket can vary as will be appreciated by one skilled in the art. However, in a preferred embodiment, the length of each access location 34, 38, measured along the length of the cable 16 (or from left to right in FIG. 3), ranges between about 0.2 and about 3 inches. Once suitably sized sections of distribution cable 16 jacket are removed, one or more dry insert 36a, 36b (dry inserts 36a, 36b, shown in FIG. 2, are present but not illustrated in FIGS. 3-6 for clarity) are exposed in cavity 30 of distribution cable 16. One or more of the dry insert(s) are cut and removed from the distribution cable 16 along the length of the distribution cable 16 extending between access locations 34, 38, thereby providing access to optical fibers 14 of the distribution cable 16.

Referring again to FIG. 3, at least one optical fiber 14 is cut at second mid-span access location 38 and separated from the remaining intact optical fibers of the distribution cable 16. The optical fiber 14 can be cut by positioning and inserting a suitable cutting tool within the second mid-span access location 38 of the distribution cable 16 and cutting the at least one distribution cable optical fiber 14. However, any other suitable method of cutting the optical fiber 14 as would be known in the art can also be utilized. The optical fiber 14 is pulled back through first mid-span access location 34 so that a portion of the optical fiber 14 extends outside of distribution cable 16. The optical fibers 14 can be selected such that the minimum bend radius of the optical fibers 14 is not violated during any part of the processes described herein. The exposed length of the optical fiber 14 can vary depending, in part, on the distance between first mid-span access location 34 and second mid-span access location 38. The spacing between first mid-span access location 34 and second mid-span access location 38, measured along the length of the cable 16, can be the in the range of 3 and 36 inches.

Figure 4:
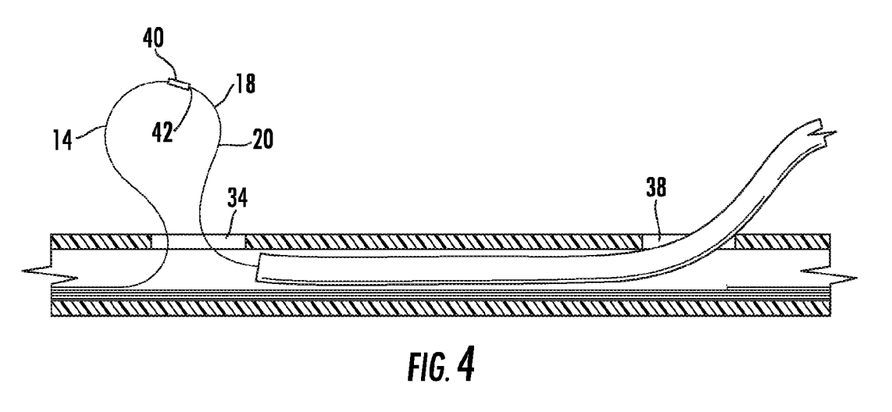
FIG. 4 is a side view of a distribution cable assembly according to certain aspects of the present invention.

With reference to FIG. 4, a tether 20 is inserted into second mid-span access location 38 of the distribution cable 16 and routed to first mid-span access location 34 where a portion of the tether 20 is withdrawn through first mid-span access location 34, leaving a remaining portion of tether 20 still remaining through second mid-span access location 38. For instance, one or more optical fibers 18 of tether 20 can be withdrawn from first mid-span access location 34, while tether jacket 48 (shown in FIG. 2) remains within distribution cable 16. In certain embodiments, tether jacket 48 can also be withdrawn from first mid-span access location 34. One or more optical fibers 18 of the tether 20 and the one or more optical fibers 14 of the distribution cable 16 are spliced together, outside of the cable 16, in any conventional manner to form a splice 40. The splice point(s) may be held and protected using one or more splice protectors 42 and/or heat deformable material.

As shown in FIG. 5, the splice 40 and connected sections of the optical fibers 14, 18 are inserted through the first mid-span access location 34 so as to be located in the interior or the cavity 30 of distribution cable 16. Alternatively, the tether 20 can be pulled through second mid-span access location 38 causing the portion of the tether 20 extending through first mid-span access location 34, as well as the splice 40 and optical fiber 14, to be pulled into the cavity 30. The tether 20 and distribution cable 16 can be strain relieved as would be known in the art.

Figure 6:
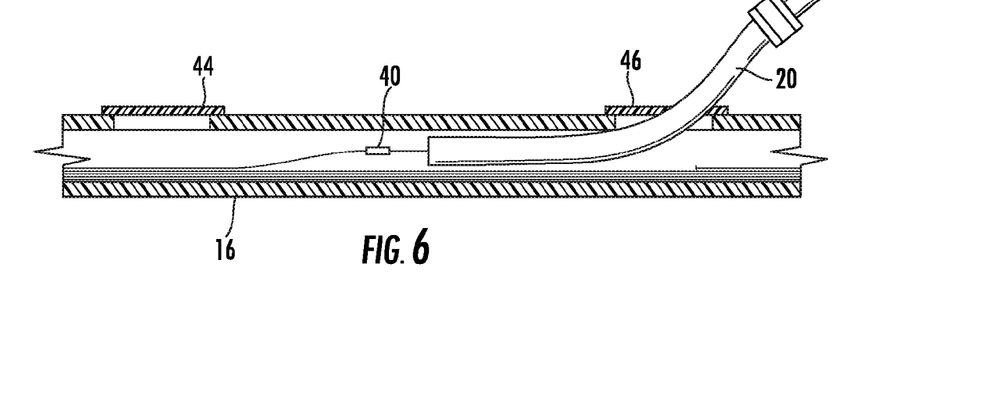
FIGS. 6, 6A, and 6B are side views of a distribution cable assembly according to certain aspects of the present invention.

With reference to FIG. 6, a water-blocking wrap and/or a protective layer for the mid-span access locations 34, 38 can be added to the distribution cable assembly 10 to assist in forming seals 44, 46 over mid-span access locations 34, 38. A protective layer such as, but not limited to, a foil made of tin or aluminum, can be used to protect the underlying components of the mid-span access location 38 prior to injection molding or overmolding the length of the mid-span access location 38. Advantageously, through the methods of the present disclosure, the resulting distribution cable assembly 10 would have a transition from the distribution cable 16 directly to the tether 20. In this regard, a short closure, injection mold, or overmold would serve to cover the transition and seal the access location.

Figure 6A:
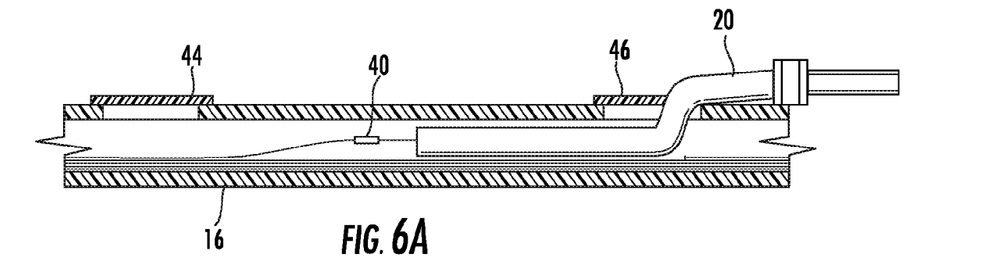
Figure 6B:
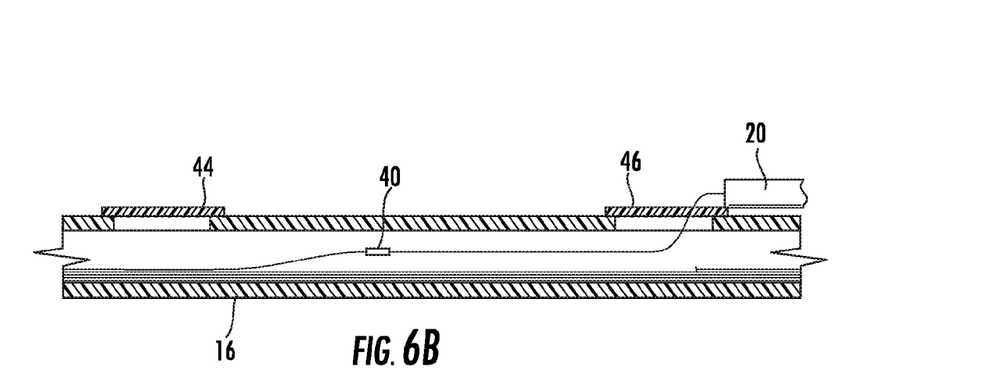

Referring to FIG. 6A, in certain embodiments, tether 20 can be shaped so that the transition from the distribution cable causes only a minimal increase in the size of the distribution cable 16. In certain embodiments, as shown in FIG. 6B, the tether jacket 48 is outside of cavity 30 of distribution cable 16 while the splice 40 is located within the cavity 30 of distribution cable 16.

Another method for manufacturing a fiber optic distribution cable assembly 10 includes creating first and second access locations 34, 38 in the distribution cable 16, as shown in FIG. 3. One or more optical fibers 14 of the distribution cable 16 are severed or terminated by extending a cutting tool through the second access location 38. A portion of the terminated optical fiber 14 is then pulled back through the first access location 34. A first end of a tether 20 is inserted through the first access location 34, pushed through the cable 16 interior, and then pulled through access location 38 so as to leave a portion of the tether 20 extending through the second access location 38. An optical fiber 18 of the tether 20 and the optical fiber 14 of the distribution cable 16 are now accessible outside of the first access location 34. They are then optically connected, such as by splice 40. The portions of the optical fibers 16, 18 extending through the first access location 34, and the splice 40 connecting them, are then re-inserted into the cable interior through the first access location 34.

In an alternative embodiment, the tether 20 is replaced by a subassembly (not illustrated). The subassembly can be, for example, a predetermined length of a plurality of fibers arranged as a ribbon, or an optical fiber or fibers that are connectorized or partially connectorized on one end and cut at the opposite end. Referring to FIG. 3, to form a cable assembly 10, the cut end of the subassembly fiber(s) is inserted through the second access location 38 into the cable 16 interior, and pulled back out of the cable through the first access location 34. One or more of the optical fibers of the subassembly and one or more of the optical fibers 14 of the distribution cable 16 are optically connected outside of the first access location, such as by splice 40. The fibers 14, 18 and splice 40 are subsequently reinserted into the cable interior. The connectorized portion of the subassembly can be positioned and encased or otherwise hardened directly onto the exterior surface of the distribution cable at the second access location 38. The connectorized portion of the subassembly can be sufficiently small so fit inside the cavity 30 of the distribution cable 16. Alternatively, the cut end of the optical fiber(s) of the subassembly can be spliced to the optical fiber(s) 14 of the distribution cable 16 outside of the cable interior at the first access location 34. The subassembly is then inserted through the first access location 34 into the cable interior, and pulled out of the cable interior through the second access location 38.

In the embodiments described in this specification, the first mid-span access location 34 can be sealed while the second mid-span access location 38 is left open or is removably sealed at the factory. In this manner, a portion of tether 20 can remain within the distribution cable 16 so that the tether 20 can be pulled from the distribution cable 16 to a specific length in the field. Suitable fibers for such applications can include bend resistant fibers, such as bend-improved or bend-insensitive fibers incorporating ClearCurve™ technology from Corning Incorporated. Once the tether 20 is pulled to the desired length, it can be strain relieved and a suitable closure can be installed in the field as would be known in the art.

Although not shown, the tether 20 can be securely attached to the distribution cable 16 via strapping, lashing, clamps or other like known fasteners at predetermined intervals along the length of the tether 20. The distribution cable 16 and the tether 20 are lashed together in the factory and wound onto a reel as a complete distribution cable assembly 10. The mid-span access location 12, the distribution cable 16 and the tether 20 are sufficiently flexible so as to permit the distribution cable assembly 10 to be wound onto a cable reel, shipped and deployed through conduit or through conventional aerial lashing equipment. The lashings remain in place during deployment of the distribution cable assembly 10 and may be removed following deployment when the mid-span access location 12 is positioned at a desired location and utilized as a distribution or termination point in the fiber optic communications network.

The foregoing is a description of various embodiments of the invention that are given here by way of example only. Although distribution cable assemblies having mid-span access locations and tethers have been described with reference to preferred embodiments and examples thereof, other embodiments and examples may perform similar functions and/or achieve similar results. All such equivalent embodiments and examples are within the spirit and scope of the present invention and are intended to be covered by the appended claims.

What is claimed:
1. A method for manufacturing a fiber optic distribution cable assembly comprising:
   accessing at least one of a plurality of optical fibers of a distribution cable by creating first and second access locations in the distribution cable, the second access location being disposed spaced apart from the first access location along the distribution cable;
   terminating the at least one optical fiber of the distribution cable through the second access location;

removing at least a portion of the at least one terminated optical fiber of the distribution cable through the first access location;

inserting a first end of a tether through the second access location and removing the first end of the tether through the first access location so as to leave a portion of the tether remaining through the second access location, the tether comprising an optical fiber;

optically connecting the at least one terminated optical fiber of the distribution cable to the optical fiber of the tether; and inserting the optically connected optical fiber of the distribution cable and tether through the first access location.

2. The method of claim 1, further comprising sealing the first access location.

3. The method of claim 1, further comprising strain relieving the tether and distribution cable, 4. The method of claim 1, further comprising sealing the second access location around the optical fiber of the distribution cable, the tether, or combinations thereof.

5. The method of claim 1, wherein:

the distribution cable comprises an exterior portion including a first generally flat surface and a second generally flat surface, the first surface being generally parallel to the second surface; and the tether comprises an exterior portion including a first generally flat surface and a second generally flat surface, the first surface being generally parallel to the second surface.

* * * * *